United States Patent [19]
Kaplan et al.

[11] Patent Number: 5,349,400
[45] Date of Patent: Sep. 20, 1994

[54] BACK-PROJECTION DISPLAY SYSTEM AND METHOD FOR MAKING A BACK-PROJECTION MIRROR

[75] Inventors: Daniel Kaplan, Paris; Jean-Claude Lehureau, Sainte Genevieve des Bois, both of France

[73] Assignee: Thomson-CSF, Puteaux, France

[21] Appl. No.: 64,164

[22] PCT Filed: Nov. 29, 1990

[86] PCT No.: PCT/FR91/00952
  § 371 Date: May 27, 1993
  § 102(e) Date: May 27, 1993

[87] PCT Pub. No.: WO92/09918
  PCT Pub. Date: Jun. 11, 1992

[30] Foreign Application Priority Data
  Nov. 30, 1990 [FR] France ............... 90 15018

[51] Int. Cl.⁵ ............................ G03B 21/28
[52] U.S. Cl. ............................ 353/119; 353/77; 359/836
[58] Field of Search ............. 353/79, 72, 94, 119, 353/74; 359/449, 448, 453, 460, 461; 348/744, 787, 794, 836

[56] References Cited
U.S. PATENT DOCUMENTS

| | | |
|---|---|---|
| 3,457,006 | 7/1969 | Brown . |
| 3,551,044 | 12/1970 | Menell . |
| 4,556,283 | 12/1985 | Numata et al. ............ 353/72 |
| 4,639,106 | 1/1987 | Gradin . |
| 4,647,166 | 3/1987 | Franken et al. ........... 353/79 |
| 5,160,951 | 11/1992 | Lander ..................... 353/79 |

FOREIGN PATENT DOCUMENTS

0131988 1/1985 European Pat. Off. .
3627646 2/1988 Fed. Rep. of Germany .

OTHER PUBLICATIONS

IBM Technical Disclosure Bulletin, vol. 12, No. 11, Apr. 1, 1970, New York, US, pp. 1946–1947; 'holographic mirrors and filters'.

*Primary Examiner*—William A. Cuchlinski, Jr.
*Assistant Examiner*—William C. Dowling
*Attorney, Agent, or Firm*—Oblon, Spivak, McClelland, Maier & Neustadt

[57] ABSTRACT

Back-projection display system including a screen which can be moved away from or, conversely, placed up against a support such as a wall, for example. A projector located at some distance away, on the ceiling for example, illuminates a back-projection mirror located at 45° in relation to the illumination beam and in relation to the screen. The back-projection mirror itself is also articulated. In addition, the mirror may be made in the form of a holographic mirror.

24 Claims, 7 Drawing Sheets

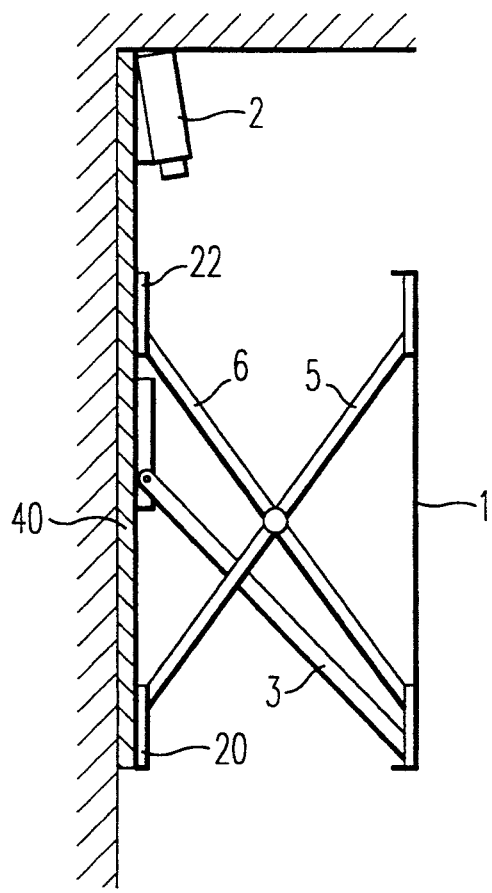
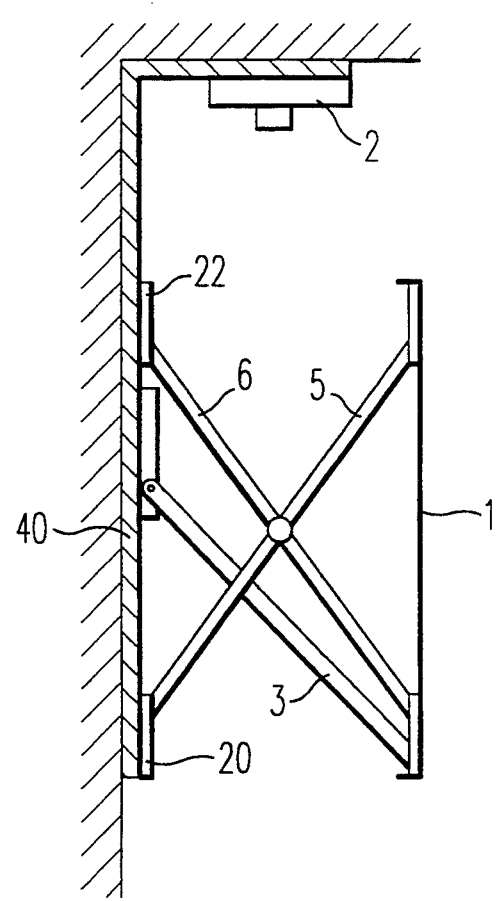
*FIG. 9*  *FIG. 10*
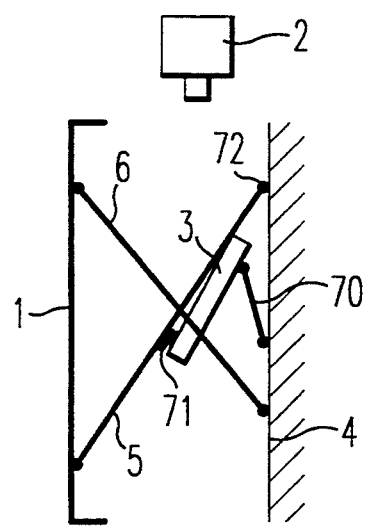
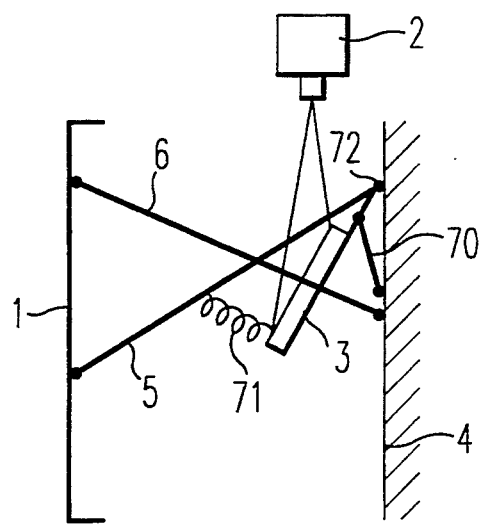
*FIG. 11*  *FIG. 12*

BACK-PROJECTION DISPLAY SYSTEM AND METHOD FOR MAKING A BACK-PROJECTION MIRROR

The invention relates to a back-projection display system and especially a system applicable to television. It also relates to a method for making a back-projection mirror, especially a holographic mirror.

Manufacturers of television-picture display systems tend to broaden their ranges of apparatuses and to offer customers the greatest possible choice. As regards the size of the picture, attempts are made to offer also all possible sizes and especially large-sized pictures, for example of the order of 1 meter wide.

Large-sized screens are inconceivable using the technique of conventional cathode ray tubes. Large-sized flat screens, either based on liquid crystals or based on cathode ray tubes, are not yet viable on an industrial scale.

Currently there exists, as a technique which is conceivable on an industrial-scale, only the technique employing projection onto a screen and the back-projection technique.

The direct-projection technique requires a low lighting level in the room in which the projection is performed.

The back projection technique can take up a lot of room on account of the size of the screen.

SUMMARY OF THE INVENTION

The invention relates to a back-projection system making it possible to solve the problem of taking up a lot of room.

The invention therefore relates to a back-projection display system comprising a display screen and a picture projector displaying pictures on the rear face of the screen, characterized in that the screen is attached to a fixed plane and in that it includes means enabling it to be moved away from this fixed plane or to be folded away against this fixed plane.

BRIEF DESCRIPTION OF THE DRAWINGS

The various objects and characteristics of the invention will appear more clearly in the description which follows and in the figures wherein:

FIGS. 9 and 10 show examples of integrated projector/screen mountings;

FIGS. 11 and 12 show a projection system enabling two picture formats to be obtained;

DETAILED DESCRIPTION OF THE PREFERRED EMBODIMENTS

Before describing the illustrative embodiments with reference to the figures, it should be pointed out that these illustrative embodiments may contain characteristics which are specific to them but which are not necessarily essential within the scope of the invention.

Figure 1:
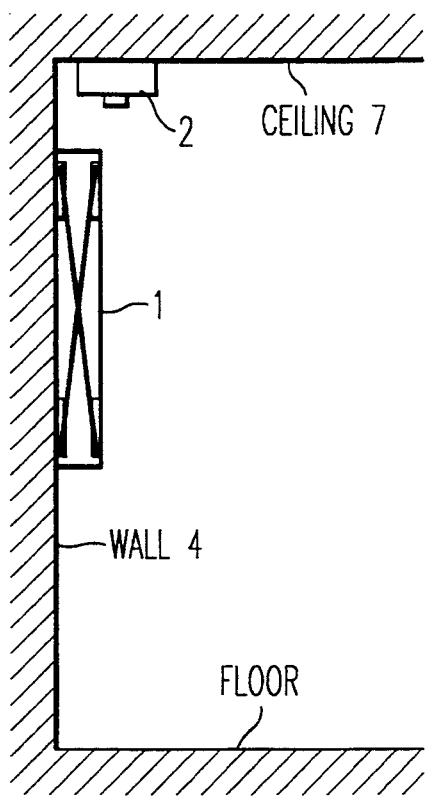
FIGS. 1 and 2 show a simplified illustrative embodiment of the device of the invention.
Figure 2:
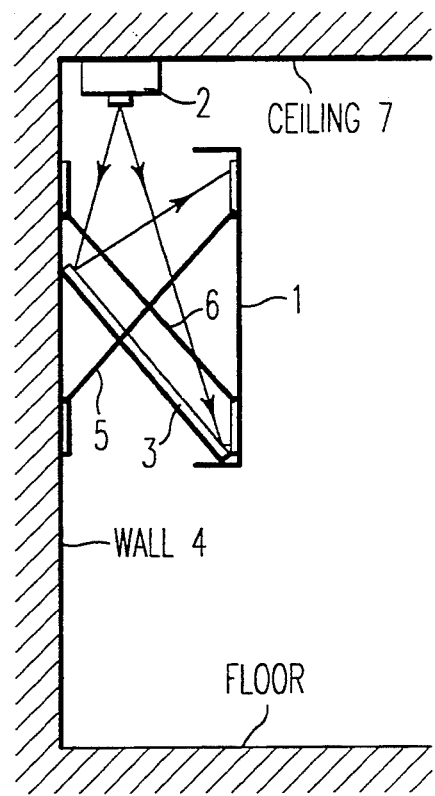

According to the system of the invention, shown in FIGS. 1 and 2, the screen 1 is attached to the wall 4 and includes a system enabling it to be folded away against the wall. The projection apparatus 2 is attached to the ceiling 7 above the screen and the projection beam is directed vertically towards a mirror 3 located at approximately 45° between the screen and the wall.

When the system is not being used, the screen 1, together with the back-projection mirror 3 is laid up against the wall 4 (FIG. 1).

During display, the screen is moved away from the wall while remaining parallel to the wall so that the back-projection mirror 3 assumes an inclined position enabling the projection beam coming from the projector 2 (FIG. 2) to be reflected onto the rear face of the screen.

The invention therefore provides articulation devices enabling the screen to be moved parallel to the wall and the inclined mirror (for example inclined at 45°) to be placed beneath the projector 2.

These articulation devices include, located on the lateral sides of the screen 1 so as not to interfere with the transmission of the beam emitted by the projector, two sets of rods, only the set 5, 6 of which may be seen in FIG. 2. These rods are attached in an articulated manner by their ends, on the one hand, to the screen 1 and, on the other hand, to the fixed support plane constituted by the wall 4. At least one end of each rod is mounted in a slideway supported by the wall or by the screen so as to be able to slide in a direction parallel to the plane of the wall or that of the screen. In the example of FIG. 2, the two ends of the rods 5 and 6 are mounted in slideways carried by the wall and by the screen. In this case, the two rods 5 and 6 may be rigidly connected together via an articulation 50 located at their middle, which enables the rigidity of the system to be increased.

When the system is not in use, the screen may therefore be folded away against the wall, as is shown in FIG. 1.

Figure 3:
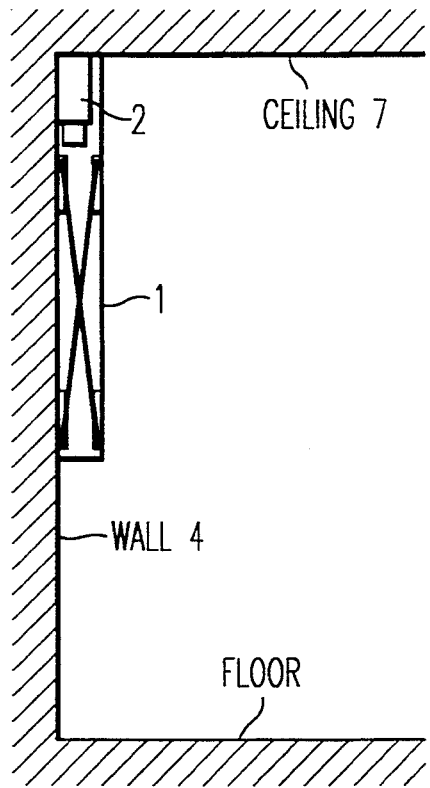
FIGS. 3 and 4 show another simplified illustrative embodiment of the device of the invention.
Figure 4:
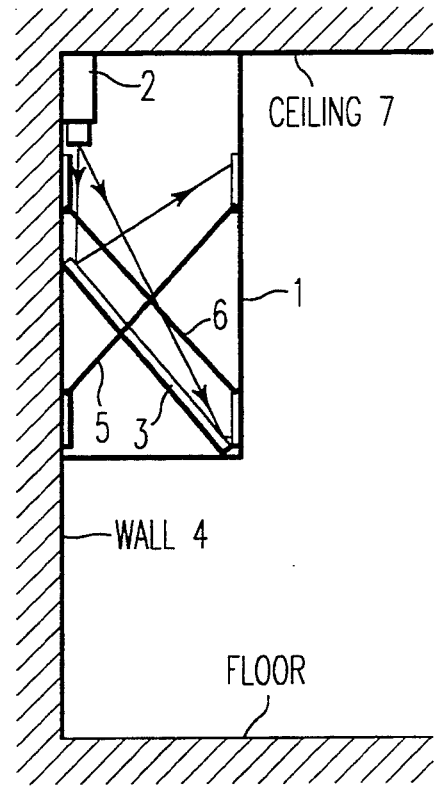

FIGS. 3 and 4 show a variant of the system of FIGS. 1 and 2, providing arrangements enabling the mirror, rear face of the screen and projector to be all protected from any contamination (especially from dust).

Figure 5A:
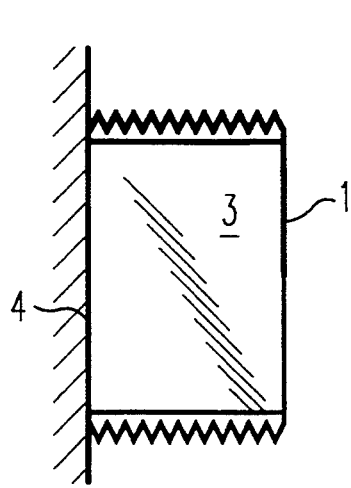
FIGS. 5a and 5b, show means for protecting the mirror.
Figure 5B:
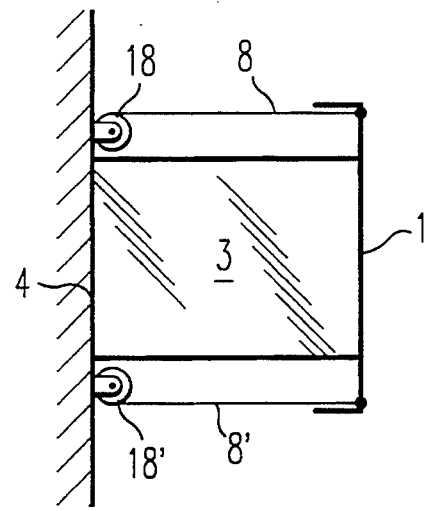

According to this variant, the screen 1 is extended as far as the ceiling 7 and possesses, on the lateral sides, folding walls 8, 8' such as shown in FIGS. 5a and 5b.

In FIG. 5a, these walls are in the form of bellows. When the screen is folded away against the wall, these bellows are contained behind the screen.

In FIG. 5b, these walls are lateral protective webs mounted on winders 18, 18' of the automatic winder type and attached to the screen. Thus, when the screen is folded away against the wall, the protective webs 8, 8' are automatically wound onto the winders 18 and 18'.

The projector 2 has a plane shape and is arranged on the wall 4 in such a way that, when the screen is folded away on the wall, it is contained behind the screen.

It may therefore be seen that such arrangements enable the projector, the reflecting face of the mirror 3 and the rear face of the screen 1, which receives the projected picture, to be protected from contamination.

Figure 6:
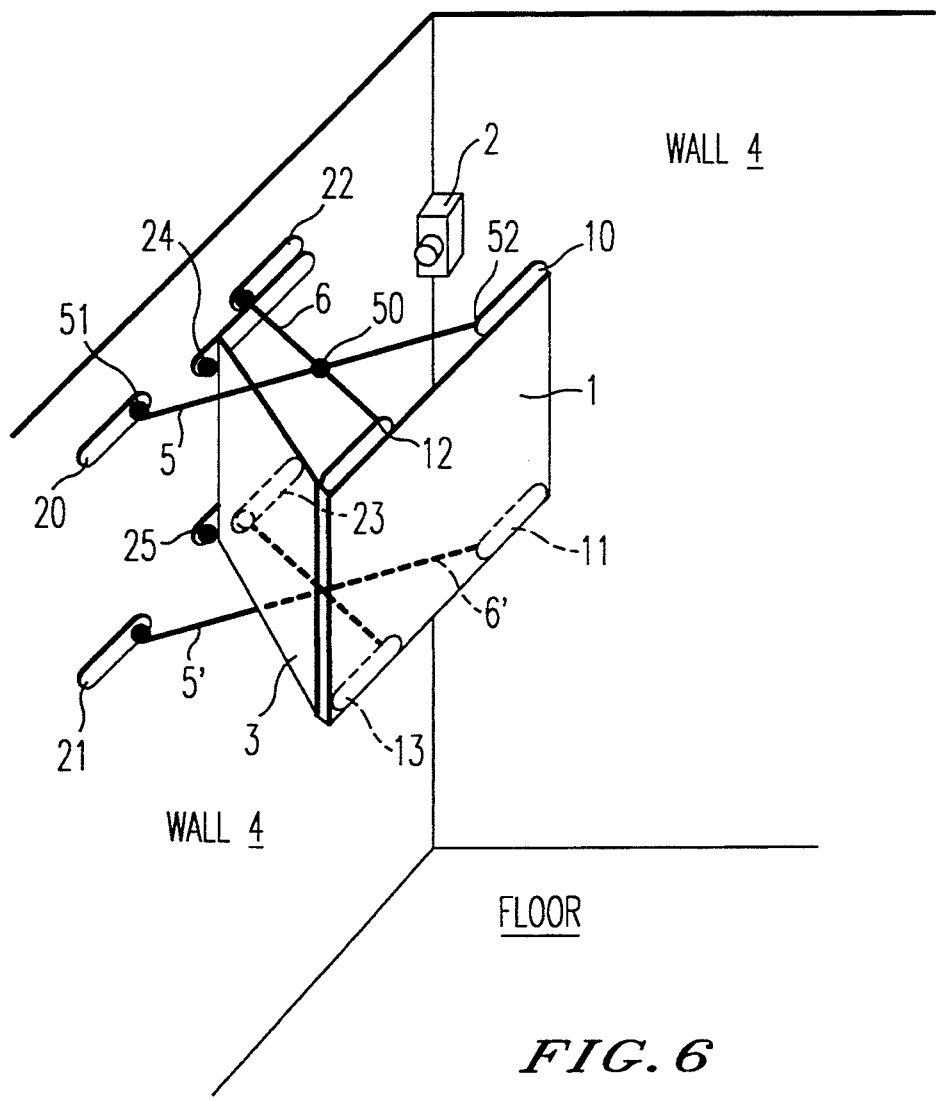
FIG. 6 shows a detailed illustrative embodiment of the device of the invention.

FIG. 6 shows an embodiment of the invention, in which the mirror 3 is arranged vertically. It is therefore articulated to a vertical side of the screen instead of being articulated to a horizontal side, as in the previous embodiment shown in FIGS. 2 and 4. The projector 2 is then placed on the wall 4 so as to permit a projection beam which is oriented horizontally towards the mirror 3. Such an embodiment has, possibly, no need for arrangements for protection against protecting from dust.

FIG. 6 also shows devices having slideways 20, 21, 22, 23 which are rigidly connected to the wall 4 and in which the ends of the rods 5, 5', 6, 6', slide, such as the end 51 in the slideway 20.

The screen also includes, on its rear face, slideways 10, 11, 12, 13 in which the other ends of these rods slide, such as the end 52 of the rod 5.

In another embodiment, which is not shown, it is possible to provide slideways at only one end of the rods, the slideways being rigidly connected to the wall for example. In this case, the rods, instead of being fitted with an articulation such as the articulation 50 of the rods 5 and 6 (see FIG. 6), have to be either free, or fitted with articulation means having slideways enabling the articulation axis to be moved along the rods depending on the position of the screen.

In addition, the mirror 3 is articulated by one of these sides to an edge of the screen. Slideways 24, 25 rigidly connected to the walls 4 receive crank pins rigidly connected to the side of the mirror 3 opposite the side articulated to the screen.

Upon folding away the screen against the wall, the ends of the rods slide in their slideways, as do the crank pins of the mirror in the slideways 24 and 25.

Figure 7:
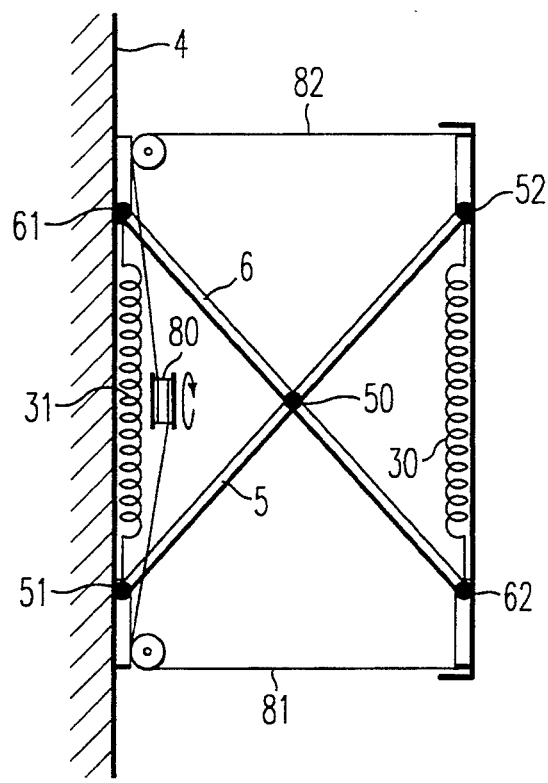
FIGS. 7 and 8 show a device for automatically controlling the manoeuvring of the screen according to the invention.
Figure 8:
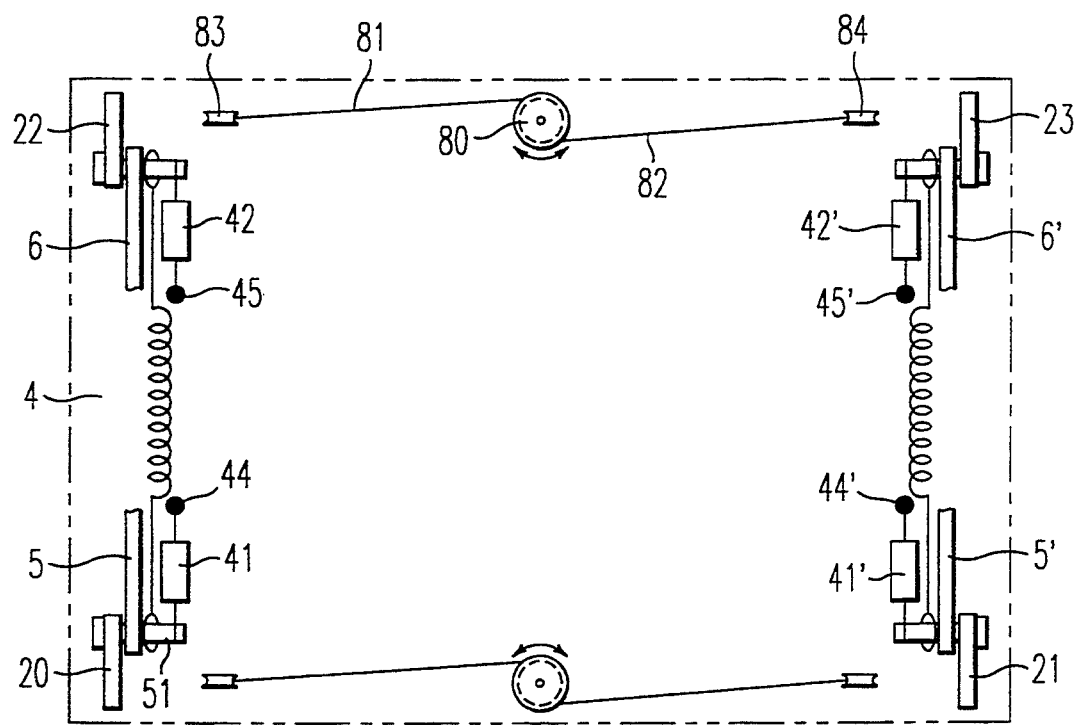

FIGS. 7 and 8 show a system for automatically opening the screen. According to this system, the ends of the rods are connected via elastic systems (springs). Thus, as may be seen in FIG. 8, the rods 5 and 6 on the one hand, and 5' and 6' on the other hand, are connected via springs at their ends located in the vicinity of the wall. The same applies for the ends of the rods which slide in slideways attached to the screen.

In the position in which it is folded away against the wall, the screen may be held against the wall by a latch system (hooks) or by a holding system (magnets).

In order to be able to move the screen away from the wall, it is therefore necessary to unlock the latch system or to exert a force sufficient to release the screen from the holding system so that the springs come into operation. The springs then tend to move the ends of the rods closer together in such a way that the screen moves away from the wall.

In order to prevent the screen from being released abruptly, dampers 41, 42, 41', 42', of the dashpot-type, for example, are provided. These dampers are attached, on the one hand, to one end of a rod and, on the other hand, to a fixed element (of the wall or of the screen). In FIG. 8, a damper associated with each end of the rods is provided.

FIG. 8 shows the actuation of the ends of the rods connected to the wall. The actuation of the ends of the rods may be performed in the same way as the side of the screen.

It should be noted that, according to this illustrative embodiment, a plurality of springs (2 springs in FIG. 8) and one damper per rod end are provided, but it is obvious that a different number of springs and dampers could be provided.

FIGS. 7 and 8 show, moreover, a system of cables enabling the screen to be folded away against the wall. This system includes, for example, one or more cables 81, 82 attached to the screen by one end and to a winding drum 80 rigidly connected to the wall 4 by another end. In FIGS. 7 and 8 there are two cables 81, 82 which are returned towards a drum 80 by means of pulleys 83, 84.

This drum 80 may be driven rotationally by an electric motor, for example.

When the screen is away from the wall, rotation of the drum 80 has the effect of winding the cables 81 and 82 onto the drum. The screen moves closer to the wall. According to a known technique, when the screen comes into contact with the wall, a contact, not shown, enables the rotation of the drum 80 to be prevented.

FIGS. 7 and 8 therefore give an example of the automatic operation of the system of the invention.

FIGS. 9 and 10 shows arrangements in which the various devices of the screen, instead of being attached to the wall, are mounted on a mounting frame 40.

This mounting frame 40 is extended towards the ceiling and the projector 2 is also mounted on this frame, which avoids the problems of adjusting the position of the projector (FIG. 9).

This mounting frame 40 may have the form of an angle (FIG. 10) so as to receive the projector 2 when the latter is not in the corner between the wall and the ceiling.

FIGS. 11 and 12 show a system enabling the screen to be moved translationally in two steps:

during the first step, the screen is moved away from the wall into an intermediate position; the mirror 3 is also moved away from the wall and assumes an approximately 45° position. It has, for example, one side connected to the wall via an articulation 72 and the other side connected to the rods 5, 5' via an elastic system 71;

during the second step, the screen is moved away from the wall as far as possible. The mirror 3 cannot move further away from the wall because a rod 70 limits its movement away. The elastic system (spring) 7 becomes tensioned. The mirror keeps its approximately 45° inclination.

This system makes it possible to have at least three positions:

1.—a position in which the screen is folded away against the wall and takes up a minimum amount of room;

2.—at least one intermediate position in which (FIG. 11):

the screen is moved slightly away from the wall and therefore takes up a small amount of room;

a displayed picture of reduced size, not occupying the entire surface of the screen, is obtained;

3.—a position at a maximum distance away from the wall (FIG. 12) in which a displayed picture occupying the entire surface of the screen is obtained.

Figure 14:
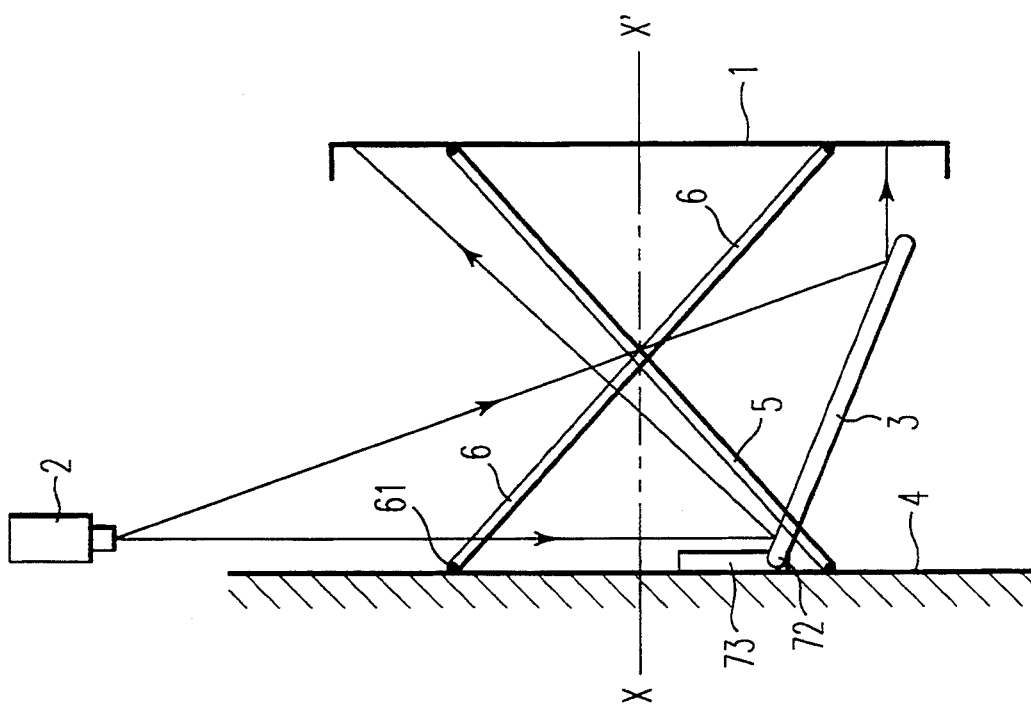
FIGS. 13, 14 show a variant of the system of FIGS. 11 and 12.
Figure 13:
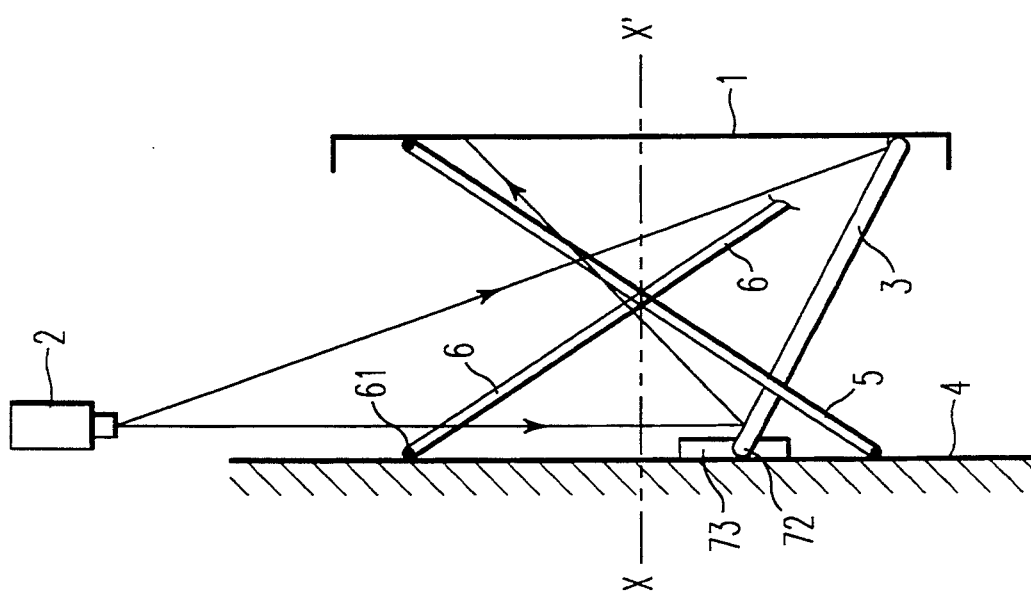

FIGS. 13 and 14 show an alternative embodiment of the system of FIGS. 11 and 12.

The articulation 72 is mounted in a slideway 73 of the same type as the previous slideways 20 to 23.

In addition, the articulation 72 is connected at the end of the rod rigidly connected to the wall 4 and located closest to the projector; in FIGS. 13 and 14 this is the end 61. Thus, movement of the articulation 72 in the slideway 73 is controlled by the movement of the end 61.

Figure 15:
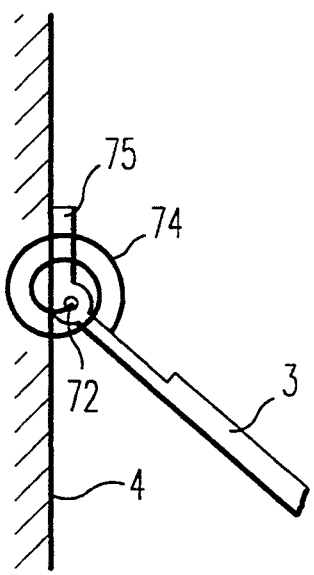
FIG. 15 shows a system for articulating the mirror.

Moreover, a spring 74, such as a spiral spring, which tends to rotate the mirror 3 and give it an oblique position in relation to the wall, is mounted on the articulation 72. In order to do this, the spiral spring 74 is attached to the articulation by its central end and to the mirror or its support by its peripheral end. A stop 75 rigidly connected to the mirror 3 (or to its support) enables the angle which the mirror can make with the wall 4 to be limited. FIG. 15 shows a detailed view of the articulation system of the mirror 3.

According to the illustrative embodiment of FIGS. 13 and 14, the mirror 3 is located entirely on the other side of the axis XX' of the screen in relation to the projector.

The operation of the system is as follows:

When the screen is moved away from the wall, the mirror moves slightly with the end 61, but above all, it rotates under the effect of the spring 74 until reaching a position such as shown in FIG. 13. The screen is not at the maximum distance away from the wall and the projected picture is of reduced size;

When the screen is moved away from the wall as far as possible, the mirror having achieved its maximum inclination, the articulation 72 moves (downwards in FIG. 14) at the same time as the end 61. The projected picture is of maximum size.

Other intermediate mirror-movement or mirror-orientation positions may also be obtained.

According to an alternative embodiment of the system of the invention, the mirror 3 is a holographic mirror. This mirror has been recorded so that, on receiving a light beam from the projector 2, it reflects it onto the screen 1.

In the case where the light beam is trichromatic, the material constituting the holographic mirror is chosen so as to reflect at least the three wavelength ranges corresponding to the three primary colors (blue, green, red). The hologram of the holographic mirror is also recorded so as to reflect a trichromatic beam.

If the projector 2 is a liquid-crystal projector, the light which it emits is a beam of polarized light. Knowing that a holographic mirror reflects light polarized perpendicularly to its plane of incidence, it is preferable to choose, in the projector 2, to emit a beam polarized in this direction perpendicular to the plane of incidence on the holographic mirror. In addition, in this application context, it may be useful to have the mirror inclined at 45° in relation to the incident beam.

Figure 16:
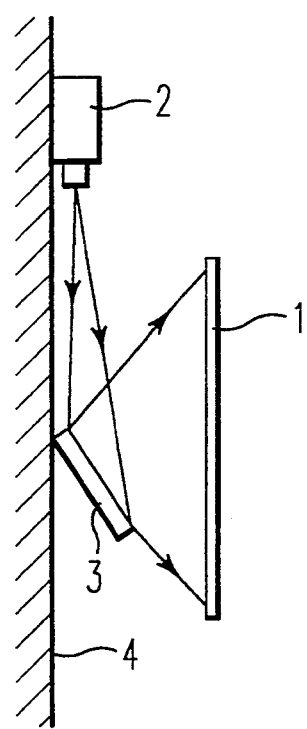
FIG. 16 shows a projection system using a holographic mirror.

Making the mirror 3 in the form of a holographic mirror has the advantage that it makes it possible to operate not only in the reflection mode but also as a divergent lens. As shown in FIG. 16, this makes it possible to be able to obtain a large-sized picture with a screen a relatively short distance away from the wall.

In the case where the optical axis of the system, more precisely the axis of the beam reflected by the holographic mirror 3, is not perpendicular to the screen 1, as is the case in FIGS. 13 and 14, there may be distortion of the projected picture. The invention therefore provides arrangements for overcoming this distortion. Principally, it provides for recording the hologram so that it is the holographic mirror which reflects the beam so as to correct the distortions.

Figure 17:
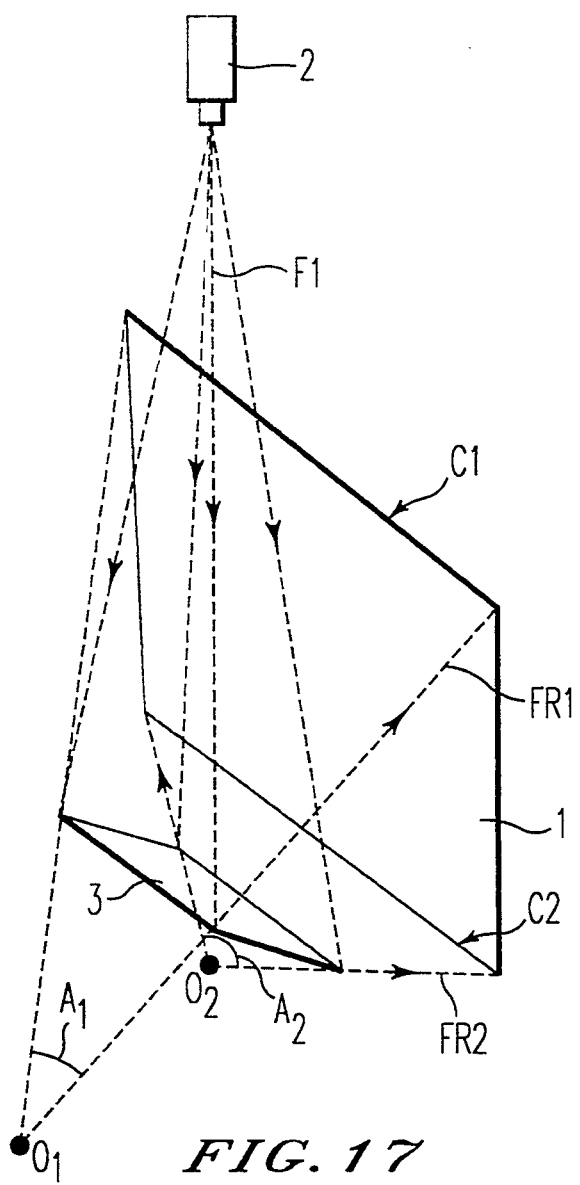
FIG. 17 shows an example of a method for recording the hologram of the holographic mirror.

FIG. 17 shows an example of a configuration which may give rise to distortions of the picture projected on the screen 1. As may be seen in this figure, the mirror 3 has to reflect onto the screen 1 a beam coming from the projector 2. It is clear in this figure that the position of the mirror in relation to the screen 1 is such that the axis of the reflected beam is not perpendicular to the plane of the screen. Under these conditions, without special precautions, a rectangular picture, carried by the beam F1, will have a trapezoidal shape on the screen, that is to say wider at the upper part of the screen and narrower at the lower part (according to the configuration of FIG. 17).

In order to overcome this, it is imperative that the mirror 3 should reflect a beam such that the size of the beam illuminating the upper side C1 of the screen is equal to the size of the beam illuminating the lower side C2 of the screen. Considering a plane beam $FR_1$ illuminating the upper side C1 of the screen and a plane beam $FR_2$ illuminating the lower side the lower side C2 of the screen, these two beams have different aperture angles $A_1$ and $A_2$.

The outer rays of the beams $FR_1$ and $FR_2$ converge respectively on points $O_1$ and $O_2$ and the beams $FR_1$ and $FR_2$ appear to come from these points.

The other intermediate beams each illuminating one horizontal line of the screen each appear to come from a point located on the line $O_1$-$O_2$.

According to the invention, provision is made to record the hologram of the holographic mirror by interference using a beam such as F1 and a beam supplied by a cylindrical lens oriented parallel to the straight line $O_1$ and $O_2$.

In the case of FIG. 17, it is also appropriate that the cylindrical lens should be illuminated by a divergent beam from a line source parallel to the plane of the hologram (mirror 3) to be recorded.

Another way of recording the hologram may be to record it picture line by picture line. In the case of a television picture, the picture is made up of lines. A line of the picture to be projected by the projector 2 should correspond to a line on the mirror 3 and a line on the screen 1. For the recording, provision is made, for each line of the mirror, for a line beam assumed to come from the projector to be made to interfere with a beam coming from a point on the straight line $O_1$ $O_2$ (or converging on the line $O_1$ $O_2$).

According to another method, it is also possible to record the hologram zone by zone. A zone will, for example, be a picture element. A picture element to be projected should correspond to an element of the mirror and therefore an element of the screen. Such a recording method enables any possible distortion of the picture to be corrected. In fact, according to this method, the position of the mirror 3 is known in relation to the screen 1 and therefore the direction of each reflected beam carrying a picture element (pixel) to the screen 1 is known.

For the recording of the hologram, a picture element beam forming part of the beam F1 is therefore made to interfere with a reference beam coming from a source such as $O_1$ or $O_2$ and this is done successively (or simultaneously) for each picture element.

Figure 18:
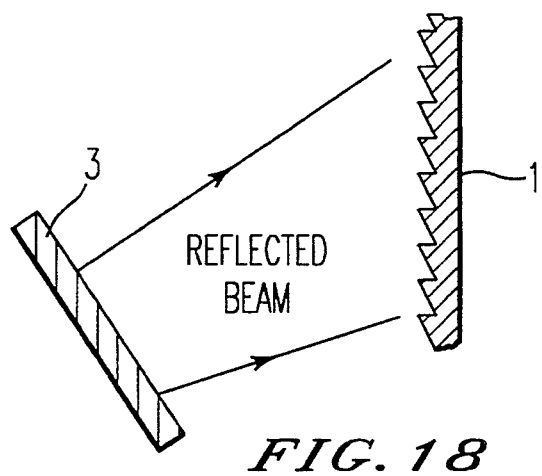
FIG. 18 shows a partial view of a grid of serrations incorporated into a screen.

According to the invention, when the beam reflected by the mirror 3 is not perpendicular to the plane of the screen 1, there is provided in the screen a grid of serrations having faces approximately perpendicular to the direction of the reflected beam, as is partially shown in FIG. 18.

It is quite clear that the above description has been given only by way of example and that other variants may be conceived without departing from the scope of the invention. In particular, the types of articulations described, and the modes of recording the holographic mirror, have only been given in order to illustrate the description.

We claim:

1. A back-projection display system, comprising:
a display screen;
a projector for displaying images on a rear face of said display screen, wherein said display screen is attached to a planar surface and includes means for folding said display screen against said planar surface and also for moving said display screen away from said planar surface so that a major surface of said display screen is maintained substantially parallel to said planar surface when said display screen is held against said planar surface and when said display screen is moved perpendicularly away from said planar surface; and
a mirror for reflecting light from said projector onto said rear face of said display screen, including means for folding said mirror against said planar surface.

2. The back-projection display system according to claim 1, wherein said mirror is a holographic mirror.

3. The back-projection display system according to claim 2, wherein said means for folding said display screen against said planar surface comprises first and second systems of rods for connecting opposite sides of said display screen to said planar surface, respectively.

4. The back-projection display system according to claim 2, wherein said mirror is connected to said display screen and said planar surface.

5. The back-projection display system according to claim 4, wherein each of said plurality of rods includes a first end having an element for sliding engagement in a slideway which is attached to said planar surface.

6. The back-projection display system according to claim 4, wherein each of said plurality of rods includes a first end having an element for sliding engagement in a slideway which is attached to said display screen.

7. The back-projection display system according to claim 5, wherein a second end of each of said plurality of rods includes a second element for sliding engagement with a second slideway attached to said display screen.

8. The back-projection display system according to claim 3, further comprising an elastic system for moving two rods of one of said systems of rods closer together to thereby cause said display screen to move away from said planar surface.

9. The back-projection display system according to claim 3, further comprising:
at least one damper member connected between one of said rods and said planar surface for controlling movement of said display screen.

10. The back-projection display system according to claim 3, further comprising:
at least one damper member connected between one of said rods and said display screen for controlling movement of said display screen.

11. The back-projection display system according to claim 1, further comprising:
a latch means for holding said display screen in a position so that said display screen is folded away against said planar surface.

12. The back-projection display system according to claim 1, further comprising:
at least one cable including a first end attached to said display screen and a second end attached to a winding drum which is coupled to said planar surface.

13. The back-projection display system according to claim 1, further comprising:
at least one cable including a first end attached to said planar surface and a second end attached to a winding drum which is coupled to said planar surface.

14. The back-projection display system according to claim 1, further comprising:
at least one cable including a first end attached to said display screen and a second end attached to a winding drum which is coupled to said display screen.

15. The back-projection display system according to claim 1, further comprising:
at least one cable including a first end attached to said planar surface and a second end attached to a winding drum which is coupled to said display screen.

16. The back-projection display system according to claim 12, further comprising a motor for driving said winding drum.

17. The back-projection display system according to claim 13, further comprising a motor for driving said winding drum.

18. The back-projection display system according to claim 14, further comprising a motor for driving said winding drum.

19. The back-projection display system according to claim 15, further comprising a motor for driving said winding drum.

20. The back-projection display system according to claim 2, wherein said holographic mirror serves as both a mirror and a lens.

21. The back-projection display system according to claim 2, wherein said holographic mirror comprises:
a hologram for correcting distortions in the beam of light projected onto said display screen.

22. The back-projection display system according to claim 2, wherein said display screen comprises a grid of serrations.

23. The back-projection display system according to claim 21, wherein said hologram is recorded using a beam having the same direction as the beam emitted by said projector with respect to the plane of the holographic mirror and using a beam transmitted by a cylindrical lens inclined in relation to the plane of the holographic mirror.

24. The back-projection display system according to claim 21, wherein said hologram is recorded zone by zone, using a beam having the same direction as the beam emitted by said projector with respect to the plane of the holographic mirror, and illuminating said zone in a direction toward a corresponding zone of said display screen.

* * * * *

UNITED STATES PATENT AND TRADEMARK OFFICE
CERTIFICATE OF CORRECTION

PATENT NO. : 5,349,400
DATED : September 20, 1994
INVENTOR(S) : Daniel KAPLAN, et al.

It is certified that error appears in the above-indentified patent and that said Letters Patent is hereby corrected as shown below:

On the title page, Item [22], the PCT Filing Date should read:

--Nov. 29, 1991--

Signed and Sealed this

Fourteenth Day of March, 1995

Attest:

BRUCE LEHMAN

*Attesting Officer*       *Commissioner of Patents and Trademarks*